United States Patent [19]

Belden

[11] 4,449,889
[45] May 22, 1984

[54] WINDMILL

[76] Inventor: Ralph A. Belden, 4th Floor #2, Lane 141, Chung-Shan N. Rd., Sec. 7, Taipei, Taiwan

[21] Appl. No.: 459,367

[22] Filed: Jan. 20, 1983

[51] Int. Cl.³ .............................................. F03D 7/00
[52] U.S. Cl. ...................................... 416/16; 416/10; 416/142; 416/102
[58] Field of Search ....................................... 416/9–11, 416/16, 142 B, 41 A, 102, 148

[56] References Cited

U.S. PATENT DOCUMENTS

| | | | |
|---|---|---|---|
| 512,712 | 1/1894 | Kelso | 416/117 |
| 623,402 | 4/1899 | Hong | 416/9 X |
| 749,806 | 1/1904 | Rue | 416/117 |
| 766,219 | 8/1904 | Clemson | 416/9 X |
| 2,044,794 | 6/1936 | Kisevalter | 416/119 |
| 2,363,827 | 11/1944 | Albers | 416/10 X |
| 2,419,384 | 4/1947 | Ault | 416/117 |
| 2,484,291 | 10/1949 | Hays | 416/11 X |
| 2,784,556 | 3/1957 | Perdue | 416/9 X |
| 3,810,712 | 5/1974 | Hillman | 416/117 |
| 4,050,246 | 9/1977 | Bourquardez | 416/132 B X |
| 4,087,202 | 5/1978 | Musgrove | 416/41 |
| 4,130,380 | 12/1978 | Kaiser | 416/197 A |
| 4,242,043 | 12/1980 | Poulsen | 416/11 |
| 4,274,809 | 6/1981 | Delgado et al. | 416/117 |
| 4,329,116 | 5/1982 | Ljungstrom | 416/19 |
| 4,334,823 | 6/1982 | Sharp | 416/119 |
| 4,353,702 | 10/1982 | Nagy | 416/9 X |
| 4,362,466 | 12/1982 | Schonball | 416/41 A X |

FOREIGN PATENT DOCUMENTS

| | | | |
|---|---|---|---|
| 33258 | 8/1981 | European Pat. Off. | 416/142 B |
| 907399 | 3/1954 | Fed. Rep. of Germany | 416/9 |
| 1118110 | 11/1961 | Fed. Rep. of Germany | 416/10 |
| 2916878 | 11/1980 | Fed. Rep. of Germany | 416/11 |
| 2951635 | 7/1981 | Fed. Rep. of Germany | 416/41 A |
| 1098141 | 7/1955 | France | 416/9 |
| 2295259 | 7/1976 | France | 416/16 |
| 2468000 | 5/1981 | France | 416/16 |
| 2049831 | 12/1980 | United Kingdom | 416/142 B |
| 158242 | 1/1963 | U.S.S.R. | 416/9 |

Primary Examiner—Everette A. Powell, Jr.
Attorney, Agent, or Firm—Wells, St. John & Roberts

[57] ABSTRACT

Disclosed is an inclined axis windmill. The windmill has a plurality of blades generally transverse to the upstanding rotor shaft. The blades have an airfoil cross-sectional shape and are oriented with a negative angle of attack, thereby allowing the leading edge of the airfoil to turn into the wind. The windmill preferably has a tilting assembly which tilts the rotor shaft and blades at an angle dependent upon the velocity of the wind. As the wind velocity increases the rotor shaft is automatically tilted into a more nearly vertical position by the control tail. This automatic tilting of the windmill provides automatic control of the rotor speed. The rotor blades are preferably pivotally connected to the rotor shaft.

17 Claims, 5 Drawing Figures

U.S. Patent   May 22, 1984   Sheet 3 of 3   4,449,889
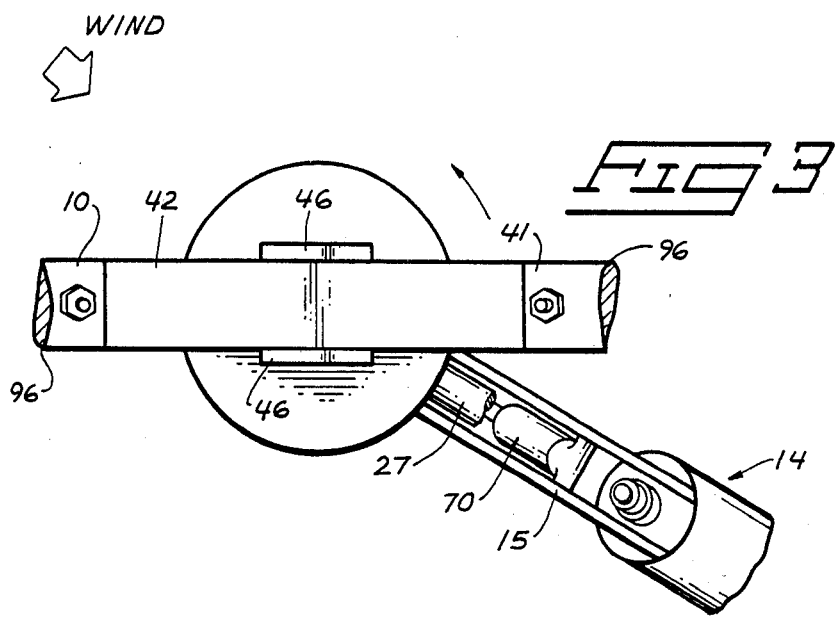
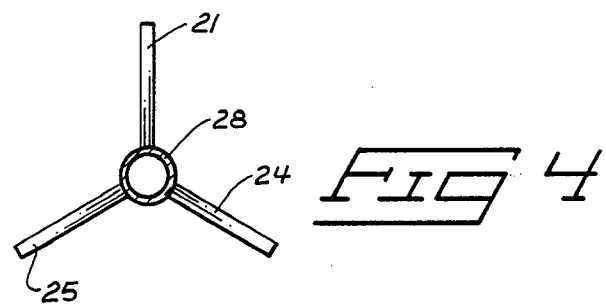
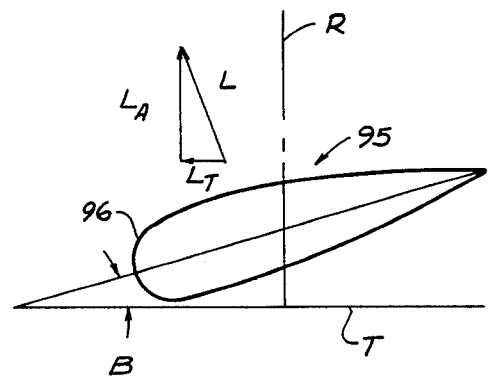

4,449,889

WINDMILL

TECHNICAL FIELD

The technical field of this invention is vertical and inclined axis windmills.

BACKGROUND OF THE INVENTION

The windmill has developed over its long history into many different and varied forms. These varied forms seek to expound upon particular aerodynamic or economic factors. In some cases, prior art windmills have been designed for aerodynamic efficiency in low speed winds. Such high efficiency windmills often were prone to damage or destruction from excessive rotational speed when exposed to high speed winds. Since the velocity of winds vary over a wide range in most areas, aerodynamic efficiency is not the sole factor for providing an economically attrative windmill.

All windmills suffer from the large forces developed on the windmill and its tower or other supporting structure during times of high velocity winds. These large forces require that both the windmill and supporting structure be strongly built. Windmills are usually mounted atop relatively tall towers to take advantage of the higher velocity winds which exist only a short distance above the ground. High wind loads applied to the windmill and tower create very large bending moments which the tower must support. In the case of horizontal axis windmills, these large bending moments cannot be alleviated by the use of guy wires or struts because the rotating windmill blades pass near to the tower along all sides of the tower as the direction of the winds change and the windmill turns with the wind. This dictates that long, slender towers without guy wires be used. Such towers are relatively expensive and the overall cost of the windmill installation is increased when compared to towers supported by guy wires.

Large scale prior art horizontal windmills also cause additional forces to be applied to the tower when the large rotor blades pass very near the windmill tower. In such large windmills, the periodic passage of the blades by the tower can create a vibratory loading which further accentuates the problem of building a sufficiently strong tower.

Another problem suffered by prior art vertical and horizontal windmills is the large fluctuations in windmill rotor speed caused by varying wind velocity. This variation in the rotor speed creates difficulties in coordinating power generated by windmills into an electrical distribution system having a fixed frequency of alternating current. The great fluctuation in windmill speed also creates problems in the mechanical design of windmills since stresses increase considerably with increased rotational speed.

Sudden changes in wind direction also have been a problem in obtaining optimum efficiency from windmills. This is especially true with horizontal axis windmills which are resistant to changes in wind direction because of the gyroscopic effect of the spinning windmill. This gyroscopic effect reduces the efficiency of the windmill because it cannot change direction sufficiently fast so as to take advantage of the full force of the wind. Vertical axis windmills have been effective in dealing with the wind direction change and gyroscopic effect problems but have still suffered from wide fluctuations in angular speed due to wind velocity changes. Sudden changes in wind direction can also cause the rotor blades to warp or flap and in some cases damage or destroy them.

The current intention has been directed to solving the problems discussed above and other problems using the windmill structure described below.

BRIEF DESCRIPTION OF THE DRAWINGS

A preferred embodiment of this invention is illustrated in the accompanying drawings, in which:

FIG. 3 is a partial top view of the upper portion of the windmill shown in FIG. 2, viewed along the rotational axis of the rotor shaft. The rotor has been rotated to more clearly show pivot head 14 and portions have been broken away and removed.

FIG. 4 is a cross-sectional view taken along line 4—4 of FIG. 1.

FIG. 5 is schematic view of the rotor blade cross-sectional airfoil shape and its orientation.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

Figure 1:
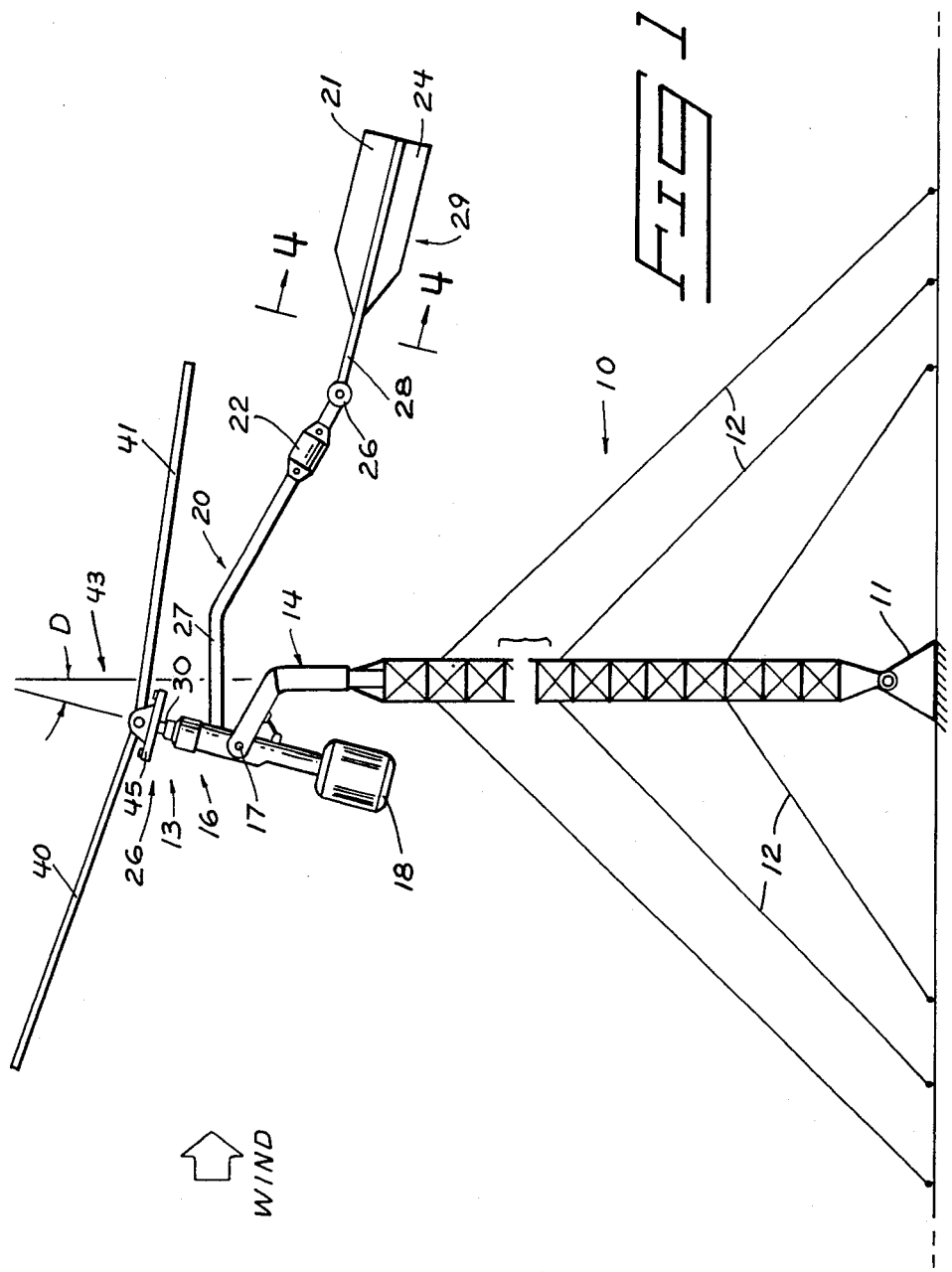
FIG. 1 is a side elevational view of a windmill according to this invention.

FIG. 1 shows a windmill constructed according to the present invention. The windmill includes a supporting structure or tower 10 which is supported on a foundation 11. In this embodiment tower 10 is pivotally connected to foundation 11 in order to reduce stress caused by deflection of the tower in the wind.

The windmill has a rotor shaft 30 which is oriented in an upright position. The upright orientation of rotor shaft 30 allows guy wires 12 to be used. The guy wires are strung from tower 10 to the ground at broad angles so that any forces applied to the tower are easily held by the long moment arm with which the guy wires act upon the tower. This tower construction is less expensive than free standing towers commonly used with horizontal axis windmills because the tower 10 need not support the horizontal forces applied by the wind and the large bending moments which result therefrom because of the guy wires 12.

A pivot head 14 is pivotally mounted to the upper end of tower 10. Pivot head 14 pivots with respect to tower 10 along a substantially vertical axis of rotation. In the preferred embodiment, a rotor head 16 is pivotally attached to pivot head 14 at tilt pivot 17. Rotor head 16 is a part of the windmill tilting assembly 13 which tilts as a unit about pivot 17. Tilt pivot 17 is preferably horizontal although angled orientations are possible.

The windmill tilting assembly 13 includes the rotor head 16, control tail 20, electricity generating means 18 and rotor 26. The rotor 26 is rotatably mounted within rotor head 16 (see FIG. 2). Rotor 26 includes rotor shaft 30, rotor hub 45 and rotor blade assembly 43. Rotor shaft 30 extends through rotor head 16 and is connected to electricity generating means shaft 19 using shaft coupling 75.

Rotor head 16 includes a set of opposed tapered roller bearings 61 and 62 which support the rotor shaft 30 and allow it to rotate relative to the rotor head 16 about the longitudinal axis of rotor shaft 30. Grease seals 63 and 64 are provided above and below bearings 61 and 62, respectively, for protecting the bearings and maintaining lubrication thereof. Shield 65 is connected to rotor shaft 30 and extends outwardly and over the top end of the rotor head sidewall 66 in order to keep water and dust from migrating into bearings 61 and 62.

Rotor hub 45 is either integral with rotor shaft 30 or is connected thereto. Rotor hub 45 includes pivot brackets 46 which extend upwardly to support pivot pin 47. Pivot pin 47 pivotally supports rotor blade assembly 43 enabling the assembly to rock back and forth as rotor 26 rotates.

Rotor blade assembly 43 includes rotor blades 40 and 41 which are mounted to rotor blade base 42 using fasteners 44. Rotor blade base 42 is preferably pivotally connected to rotor hub 45 by pivot pin 47. The rocking motion of rotor blade assembly 43 is limited by stops 48 so that the rotor blades cannot tilt too low into the wind when the rotor shaft 30 is in its most upright position.

The rotor blade assembly 43 can alternatively have three, four or more rotor blades. Such a rotor blade assembly is attached to a rotor hub using a gimbal or other means for allowing the rotor blade assembly to rock back and forth in all directions. The rotor blades could alternatively be individually mounted by pivots to the rotor hub or mounted using a fully articulated connection such as used in many helicopter rotor assemblies.

Figure 2:
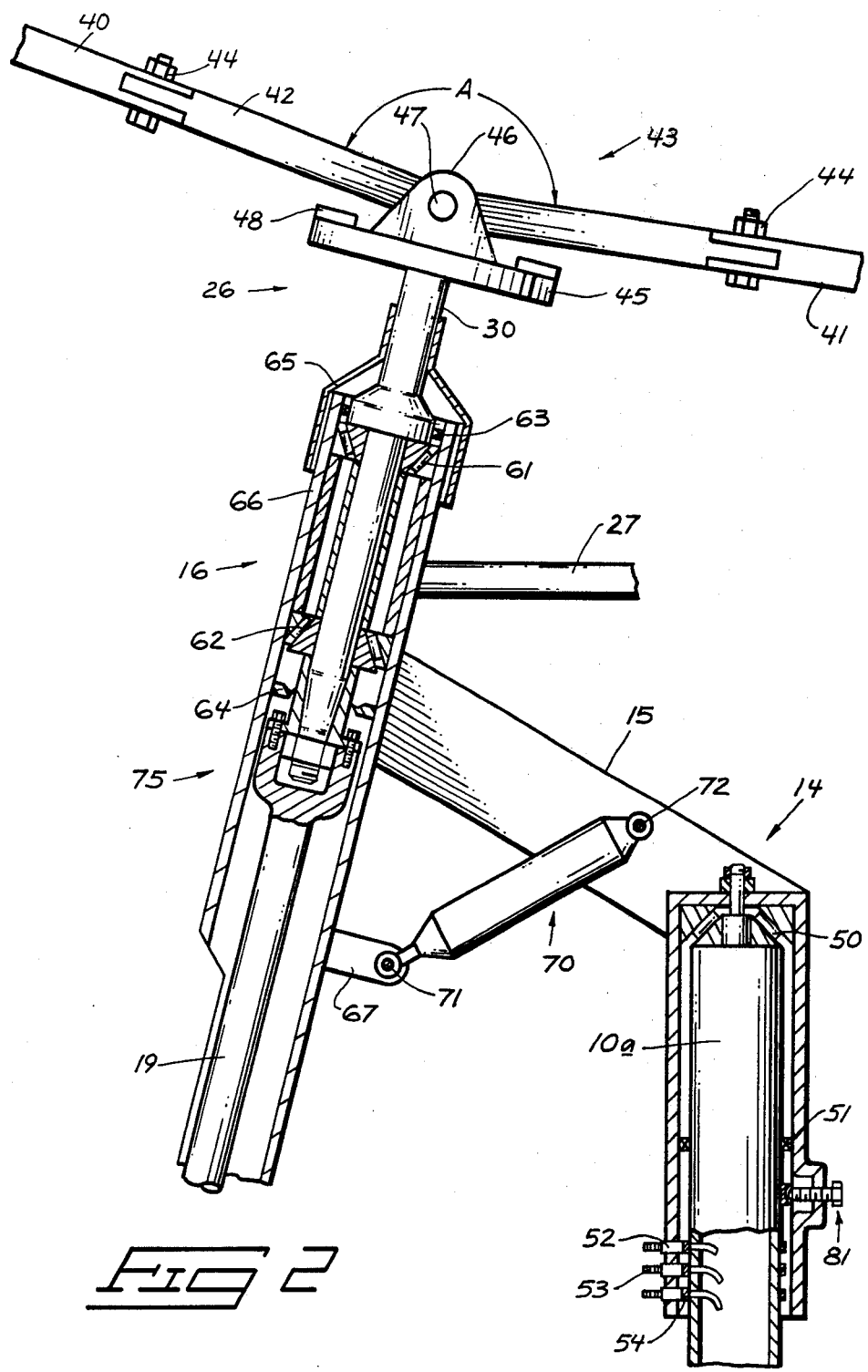
FIG. 2 is an enlarged cross-sectional side view of the upper portion of the windmill shown in FIG. 1.

FIG. 2 shows rotor blades 40 and 41 are mounted in a fixed relationship which forms a broad V-shape having an included angle A which is preferably slightly less than 180°. An included angle of approximately 174° has been found desirable.

Rotor blades 40 and 41 have a cross-sectional shape which is an airfoil. FIG. 5 shows a possible cross-sectional airfoil shape 95 for blades 40 and 41. The chord 48 of airfoil 95 angles downwardly with respect to a plane perpendicularly transverse to the axis of rotation R of rotor shaft 30. This transverse plane is represented by line T in FIG. 5. The downwardly angled orientation of chord 48 is termed a "negative angle of attack". The negative angle of attack B is preferably between 3° and 10° of arc although the exact angle varies with the particular airfoil chosen for the rotor blades and the performance characteristics desired.

The windmill tilting assembly 13 also comprises a control tail 20 which is attached to the rotor head 16 at sidewall 66. Control tail 20 extends outwardly from the rotor head and preferably over the pivot axis of pivot head 14, although extension directly over the pivot axis is not necessary. Control tail 20 is used to orient the rotor shaft 30 so that the upper end is tilted backwardly in the direction that the wind travels. This orientation of rotor shaft 30 causes the rotor blades 40 and 41 to sweep to their highest points as the ends of the rotor blades point toward the wind. Control tail 20 also automatically adjusts the tilt angle D between the axis of rotor shaft 30 and vertical as will be explained below.

Control tail 20 includes a set of vanes 21, 24 and 25. Vanes 21, 24 and 25 are mounted on a vane shaft 28 to form a vane assembly 29. In the preferred embodiment shown in FIG. 4, the vane assembly has an upstanding vane 21 and side vanes 24 and 25 which extend radially outward and downwardly from the vane shaft 28. Vane assembly 29 is connected to control tail arm 27 at a locking pivot 26 which can be adjusted to change the pitch of the vane assembly 29. The pitch of vanes 21, 24 and 25 is upwardly into the wind as shown in FIG. 1. As the wind strikes the vane assembly 29, it creates a wind force or aerodynamic lift which tends to lift the vane assembly 29. This lift creates a moment about tilt pivot 17 which tends to tilt the tilting assembly 13 counterclockwise as shown in FIG. 1. As the velocity of the wind increases, the tilt angle D automatically becomes smaller thereby tilting the rotor blade assembly 43 into a more horizontal orientation. This reduces the rotational speed of the rotor and reduces aerodynamic, centrifugal and other forces placed on the windmill. Preferably the tilt angle is maintained between 3° and 10° during normal operating conditions.

Control tail 20 preferably includes an adjustable counterweight 22 which can be positioned along the control tail arm 27 at an appropriate point so as to achieve the desired tilt angle D of tilting assembly 13. Adjustable locking pivot 26 and counterweight 22 allow the tilt angle D to be adjusted for a given wind velocity. They also allow the rate of change of change of tilt angle D to be adjusted.

A shock absorber 70 is preferably provided to stabilize the tilting assembly 13 and to prevent it from wild fluctuations in the wind. Shock absorber 70 also acts as a stop to prevent the tilt angle D from becoming less than 3° and from becoming greater than 45°. Shock absorber 70 is pivotally connected at its lower end by pivot 71 to an extension 67 from rotor head sidewall 66. Shock absorber 70 is pivotally connected at its upper end by pivot 72 to the upper extension 15 of pivot head 14.

The tilting assembly 24 can also include an electricity generating means 18 which is rotated by the rotor 26. Electricity generating means 18 can be either an alternator or a generator. The electricity generating means 18 has a shaft 19 which is connected to rotor shaft 30 by shaft coupling 75. Alternatively, an electricity generating means could be connected to rotor shaft 30 using belts or gears so as to achieve a rotation speed increase.

FIG. 2 shows an enlarged view of pivot head 14. Pivot head 14 preferably includes a roller bearing 50 and at least one rotational guide bearing 51 which helps to maintain the pivot head in a coaxial relationship with the upper end 10a of tower 10. A set bolt 81 is provided to restrict pivotal motion of pivot head 14 or to fix the pivot head for maintenance purposes.

Pivot head 14 pivots or rotates about a pivot head axis which is substantially vertical thereby keeping the rotor head 16 and tilting assembly 13 at approximately the same height above the ground for any particular orientation of the windmill. A vertical pivot head axis also prevents the tilt angle D from being affected by the directional orientation of pivot head 14. An inclined pivot axis for pivot head 14 is possible but would complicate the operation of the rotor since changes in wind direction would lead to a varying tilt of the tilting assembly 13.

Pivot head 14 also includes a set of electrical connections 52 which are connected to electrical wires 53 which run from the alternator or generator 18 to pivot head 14. Sliding contacts 54 transfer energy produced by the alternator 18 to the stationary tower 10 while allowing pivot head 14 to pivot endlessly in one direction without twisting the electrical supply cables from the alternator.

Pivot head 14 has an upper extension 15 which extends upwardly and outwardly from the pivot head axis of pivot head 14. Tilt pivot 17 is located near the distal end of upper extension 15 for pivotally supporting the tilting assembly 13.

The operation of the windmill will now be described referring first to FIG. 1. Wind blows at the windmill and through blade assembly 43 causing rotor 26 to rotate. The direction of rotation of rotor 26 is shown in FIGS. 3 and 5. As those figures indicate, the airfoil shaped rotor blades 40 and 41 rotate with the leading edge 96 moving into the wind as the rotor angles upwardly because of the tilt angle D. The rotor blades 40 and 41 are able to rotate into the wind because of the negative angle of attack B (see FIG. 5). To understand how this works first consider the total lifting force L which results from the flow of air over airfoil 95. Lifting force L is represented by a force vector L in FIG. 5. The direction of lifting force L is tilted from the rotational axis R toward the leading edge 96 of the airfoil 95. This creates a transverse component $L_T$ of the lifting force L which creates torque to rotate the rotor blade 41 into the direction of the wind. Further torque may be produced by aerodynamic drag on the opposite blade 40 if the rotor speed (at any particular radius) is less than the velocity of the wind.

The axial component $L_A$ of the lifting force L acts parallel to axis R and does not act to rotate the rotor 26 but instead causes the rotor blade assembly 43 to be lifted. This in turn causes the assembly 43 to rock back and forth about pivot pin 47 because the axial lifting components which exist at any particular time are usually not equal for both blades 40 and 41. The rocking motion of rotor blade assembly 43 helps to reduce stress on the rotor shaft 30 and rotor hub 45 because rocking of the rotor blade assembly changes the direction and velocity of the apparent wind (wind as seen by the rotor blades 40 and 41) thereby helping to equalize the aerodynamic forces produced by the rotor blades.

The aerodynamic lifting forces produced by rotor blade 41 moving into the wind are substantially greater than the lifting forces produced by rotor blade 42 moving with the wind, because blade 41 has a greater relative velocity with respect to the wind. As blade 41 moves into the wind, the lifting force becomes relatively great and rotor blade 41 rocks upwardly and rotor blade 40 rocks downwardly.

The tilting assembly 13 is oriented so that the rotor shaft 30 tilts backwardly at its upper end in the direction that the wind travels. This orientation is maintained by the control tail 20. Control tail 20 also automatically changes the tilt angle D in response to the velocity of the wind. When the wind has a low velocity in the range of 2 miles per hour, the tilt angle D may advantageously be as high as 45°. This allows the rotor 26 to start rotating in very low velocity winds. As the wind velocity increases, the rotor 26 rotates faster and the vane assembly 29 causes tilting assembly 13 to tilt so that rotor shaft 30 becomes closer to vertical. This automatic tilting of the rotor shaft into a more upstanding position tends to decrease the torque produced by rotor blades 40 and 41 about rotor shaft 30. The rotational speed of rotor 26 is thereby automatically adjusted at the wind velocity changes.

The magnitude of tilt angle D can be adjusted by moving counterweight 22 along control tail arm 27 and also by adjusting the angular position of vane assembly 29 at locking pivot 26. The rate of change of the tilt angle D for a given change in wind velocity is also adjustable by rotating the vane assembly 29 at locking pivot 26 and by moving counterweight 22. Rotating vane assembly 29 downwardly causes a greater decrease in tilt angle D for a given wind velocity increase, and vice versa.

The automatic adjustment of tilt angle D greatly reduces the chance of damaging or destroying the windmill from overspeeding. The automatic adjustment maintains a nearly constant rotor speed with wind velocities of approximately 15 miles per hour and greater. The upstanding position of tilt assembly 13 when wind velocity is high also reduces the drag force on the windmill which further helps the windmill to withstand high velocity winds without damage.

The upstanding orientation of rotor shaft 30 also allows the windmill to more easily adjust for changes in wind direction. Horizontal axis windmills are not easily responsive to changes in wind direction because of the gyroscopic effect of the spinning windmill rotor. The current invention has an upright axis of rotation which does not experience as large a gyroscopic angular change for a given change in wind direction as does a horizontal axis windmill. Since the gyroscopic angular change of the rotor axis is smaller, the force necessary to overcome the gyroscopic effect and rotate the windmill is less and the control tail 20 can more quickly keep the windmill properly oriented with respect to the wind and with less force thereby increasing the efficiency.

The upstanding orientation of the rotor axis is also advantageous because the rotor blades 40 and 41 are effective at removing power from the wind even though the rotor head 16 may not be precisely oriented into the wind. This further adds to the efficiency and stable speed regulation of this windmill.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A windmill for rotating in a wind comprising:
a pivot head pivotally mounted to a supporting structure for pivotal movement about an approximately vertical pivot head axis;
a tilting assembly having a rotor head which is pivotally connected to the pivot head of an approximately horizontal tilt pivot, the tilting assembly further comprising:
(a) a rotor shaft rotatably mounted to the rotor head for rotation about a longitudinal axis of the rotor shaft; said longitudinal axis of the rotor shaft being oriented in an upstanding position and inclined backwardly toward said vertical pivot head axis;
(b) at least one rotor blade connected to the rotor shaft in an approximately transverse relationship to the longitudinal axis of the rotor shaft; said rotor blade having a cross-sectional shape forming an airfoil; said airfoil having a negative angle of attack with respect to a plane perpendicular to the longitudinal axis of the rotor shaft;
(c) a control tail connected to the rotor head and extending outwardly therefrom beneath the rotor blade in order to catch the wind and orient the rotor shaft so that it inclines backwardly in the direction the wind travels; the control tail also including at least one vane thereon opposite from the rotor head; said vane being properly shaped and oriented to generate an increasing lifting force when exposed to increasing velocity winds to automatically tilt the tilting assembly into more upright positions to reduce aerodynamic forces on the rotor blade, automatically controlling the rotational speed of the rotor under varying wind conditions.

2. The windmill of claim 1 wherein the tilting assembly is tilted backwardly with the upper end of the rotor shaft angled backwardly in the direction the wind travels at least 3° and no more than 45° of arc.

3. The windmill of claim 1 further comprising an electricity generating means coupled to the rotor shaft for generating electrical power from the action of the wind through the windmill.

4. The windmill of claim 1 further comprising an electrical alternator coupled to the rotor shaft for generating electrical power from the action of the wind through the windmill.

5. The windmill of claim 1 wherein the control tail has at least one vane thereon for causing the control tail to pivot the pivot head in response to the direction of the wind; said control tail also having surfaces for creating lift for creating a moment about the tilt pivot; the magnitude of the moment varying in response to the velocity of the wind to cause the tilting assembly to be oriented automatically at a predetermined tilt angle for a given wind velocity thereby allowing the rotational speed of the rotor shaft to be automatically adjusted.

6. The windmill of claim 5 wherein the control tail has one upstanding vane and two side vanes extending outwardly and downwardly.

7. The windmill of claim 1 further comprising a counterweight which can be adjustably positioned along the control tail for adjusting the tilt angle of the tilting assembly.

8. The windmill of claim 1 wherein the control tail includes a vane assembly which is adjustable so that the tilt angle and rate of change of the tilt angle can be adjusted.

9. The windmill of claim 1 wherein the rotor blade or blades are pivotally connected to the rotor shaft.

10. The windmill of claim 1 further comprising a rotor blade base which is pivotally attached to the rotor shaft; the rotor blade base having at least two rotor blades extending therefrom to form a rotor blade assembly which can pivot with respect to the rotor shaft.

11. The windmill of claim 1 wherein there are more than two rotor blades connected together to form a rotor blade assembly; the rotor blade assembly being connected to the rotor shaft using a means for allowing the rotor blade assembly to rock back and forth in all directions.

12. The windmill of claim 1 further comprising a shock absorber attached between the tilting assembly and the pivot head for stabilizing the tilting assembly.

13. A windmill for rotating in a wind, comprising:
  a tower;
  a pivot head pivotally mounted to the tower and pivotable about a substantially vertical pivot head axis; and
  a tilting assembly pivotally connected to the pivot head at a tilt pivot; said tilting assembly comprising:
  (i) a rotor head connected to the pivot head at a position offset from the pivot head axis;
  (ii) A rotor shaft mounted to the rotor head and having a longitudinal axis about which the rotor shaft is adapted for rotation relative to the rotor head; the longitudinal axis of the rotor shaft defining a tilt angle with respect to vertical;
  (iii) a rotor blade assembly having at least one rotor blade and attached to the rotor shaft so that the rotor blade is approximately transverse to the longitudinal axis of the rotor shaft; said rotor blade having a cross-sectional shape which is an airfoil having a negative angle of attack with respect to a plane perpendicular to the longitudinal axis of the rotor shaft;
  (iv) electricity generating means connected to the rotor shaft for producing electrical current from the rotation of the windmill; and
  (v) a control tail extending backwardly from the rotor head beneath the rotor blade and having at least one vane thereon; said control tail serving to orient the pivot head and the attached tilting assembly so that the rotor shaft tilts backwardly in the direction the wind travels, said control tail also having vanes thereon to create lift for automatically decreasing the tilt angle of the tilting assembly when the wind velocity increases, and to increase the tilt angle when the wind velocity decreases so that the angular velocity of the rotor shaft is automatically adjusted to maintain a desired velocity.

14. The windmill of claim 13 wherein the tilt angle is at least 3° of arc.

15. The windmill of claim 14 wherein the negative angle of attack is between 3° and 10° of arc.

16. The windmill of claim 14 further comprising a counterweight which can be adjustably positioned upon the control tail so that the tilt angle and rate of change of the tilt angle can be adjusted.

17. The windmill of claim 14 wherein there are a plurality of vanes on the control tail forming a vane assembly; said vane assembly being adjustable in pitch so that the tilt angle and rate of change of the tilt angle can be adjusted.

* * * * *